Figure 1:
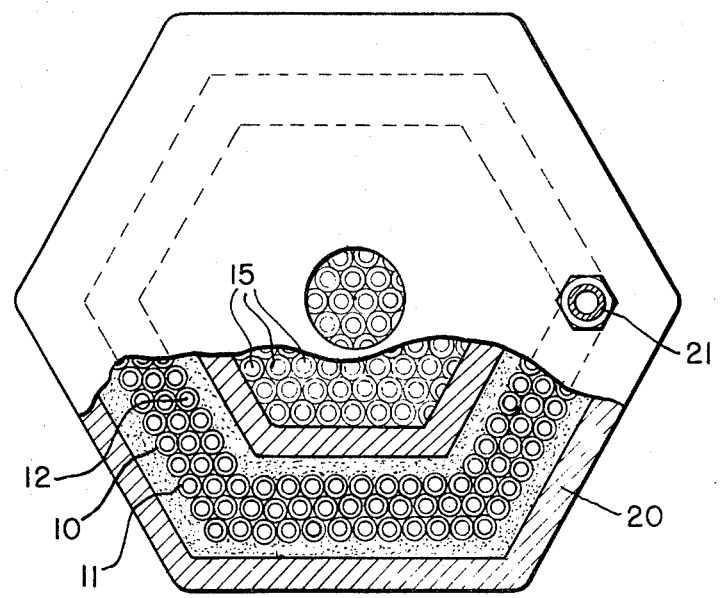

United States Patent [19]

Schulman

[11] 3,990,874

[45] Nov. 9, 1976

[54] PROCESS OF MANUFACTURING A FIBER BUNDLE

[75] Inventor: Ronald Schulman, Chicago, Ill.

[73] Assignee: Ni-Tec, Inc., Skokie, Ill.

[22] Filed: Sept. 24, 1965

[21] Appl. No.: 490,782

[52] U.S. Cl. .................................. 65/4 B; 65/110; 65/DIG. 7; 264/89; 269/94
[51] Int. Cl.² ........................................ C03C 23/20
[58] Field of Search .............. 65/4, 13, 54, 55, 4 A, 65/4 B, 110, DIG. 7; 264/94, 89, 96, 248

[56] References Cited
UNITED STATES PATENTS

| | | | |
|---|---|---|---|
| 3,190,735 | 6/1965 | Kapany | 65/DIG. 7 |
| 3,224,851 | 12/1965 | Hicks, Jr. | 65/DIG. 7 |
| 3,331,670 | 7/1967 | Cole | 65/DIG. 7 |
| 3,622,291 | 11/1971 | Fleck | 65/110 |
| 3,622,292 | 11/1971 | Fleck | 65/110 |

*Primary Examiner*—Samuel W. Engle
*Assistant Examiner*—Peter A. Nelson
*Attorney, Agent, or Firm*—Richard O. Gray, Jr.

[57] ABSTRACT

In the disclosed process, a multiplicity of like fibers of fusible material are arranged in a bundle which is brought to the drawing temperature. The bundle is drawn to reduce its cross sectional area while retaining its cross sectional configuration. During the drawing step, a fluid pressure is maintained in the peripheral rows of fibers which exceeds that of the remaining fibers of the bundle to maintain a substantially uniform diameter of the fiber elements in the resulting drawn fiber bundle.

5 Claims, 2 Drawing Figures

U.S. Patent  Nov. 9, 1976  3,990,874

INVENTOR.
Ronald Schulman
BY
Francis W. Crotty
Attorney

PROCESS OF MANUFACTURING A FIBER BUNDLE

The present invention concerns the process of manufacturing a fiber bundle particularly in connection with the fabrication of a channel multiplier. The invention is an improvement over the process described and claimed in the copending application Ser. No. 482,327, filed Aug. 20, 1965, in the name of Joseph Singer, Jr., and assigned to the same assignee.

A channel multiplier plate is usually made by assembling a large number of macroglass tubing or channel elements into a hexagonal macroboule. This may be accomplished by forming a bundle of hollow channel elements within a mold of hexagonal cross section. The channel elements themselves may be round or hexagonal in cross section and may be made of glass that is rich in metallic oxide such as lead oxide. Heat treating the bundle of channel elements while contained within the mold permits their being fused into a macroboule unit of hexagonal cross section. The macroboule is inserted into a vertical oven and the temperature raised to the softening point of the glass and drawing or pulling of the softened glass reduces the macroboule in cross sectional dimension by at least an order of magnitude, forming what is known in the art as a microbundle. If the diameter of the channel elements of the macroboule is of the order of 0.125 inches, the diameter in the microbundle may be approximately 0.002 inches.

A number of such microbundles may again be assembled to form a larger unit referred to as a microboule which is similarly treated in a vertical oven and pulled or stretched to arrive at a so-called microboule of second order which may be sliced into a microchannel plate. Processes for forming the macroboule, the microbundle and the microboule are described in the above-mentioned application.

It has been found through experience that the cross sectional configuration of the macroboule is retained in the pulling process so that the microbundle, while of reduced dimension has essentially the same cross sectional configuration as the starting component. It has been determined, however, that the diameter of the channel elements in the microbundle may vary with radial distance from the center of the bundle, specifically, the diameter tends to decrease with radial spacing. This reduction in channel diameter is most pronounced if the shrinking ratio during pulling is increased even if the temperature distribution in the oven is quite uniform. If such a change in diameter is experienced in forming the microbundle, it tends because of surface tension of the glass to be further accentuated in the remaining processing steps leading to the formation of the microboule of the first and second order.

It may be shown that the variation in diameter of the channel elements adversely affects the uniformity of gain of the multiplier. Specifically, the gain of an individual channel element in a channel multiplier plate is determined by or varies with the ratio of the channel length to channel diameter for any given excitation potential applied across the plate. Where the aforedescribed variation in channel diameter results from the forming process, the peripheral elements of any microbundle will under normal operating condition have less gain than the elements that are more centrally located under normal operating condition. Because of this variation in gain, an image translated through a microchannel plate made from a mosaic or pattern of slices from such microbundles exhibits less brightness at the boundaries where the slices of the microboules meet. This phenomenon is referred to as a fixed pattern noise which is undesirable.

Accordingly, it is an object of the present invention to provide an improved process for forming fiber bundles in which fixed pattern noise effects are minimized.

It is a specific object of the invention to provide a process of forming a fiber bundle, suitable for use in making microchannel plates, characterized by a more uniform diameter of channel elements than exhibited by fiber bundles as made heretofore.

It is another particular object of the invention to improve the process of forming a microbundle to minimize the noise pattern of channel plates formed from such a bundle.

The manufacture of a fiber bundle in accordance with the process of the invention comprises the steps of forming a plurality of similar hollow elements of fusible material into a bundle of desired cross sectional configuration and area. This bundle is heated to a drawing temperature, that is to say, to a softening temperature at which the elements are sufficiently soft to be drawn by pulling and the heated bundle is drawn into a bundle of substantially similar cross sectional configuration but much reduced cross sectional area. The process further comprises maintaining in the bundle, during the drawing step, a differential fluid pressure by establishing a fluid pressure within the peripheral elements of the bundle which exceeds that of the central elements of the bundle. Optimum results are obtained by having a uniform pressure gradient with a maximum pressure at the outer periphery of the bundle and a minimum pressure at the center. As a practical matter, it is most convenient to have step-like variations in pressure to establish the desired differential and an acceptable improvement is readily realized by merely increasing the pressure in the peripheral rows of the bundle without actually changing the fluid pressure within the remaining elements of the bundle.

Figure 2:
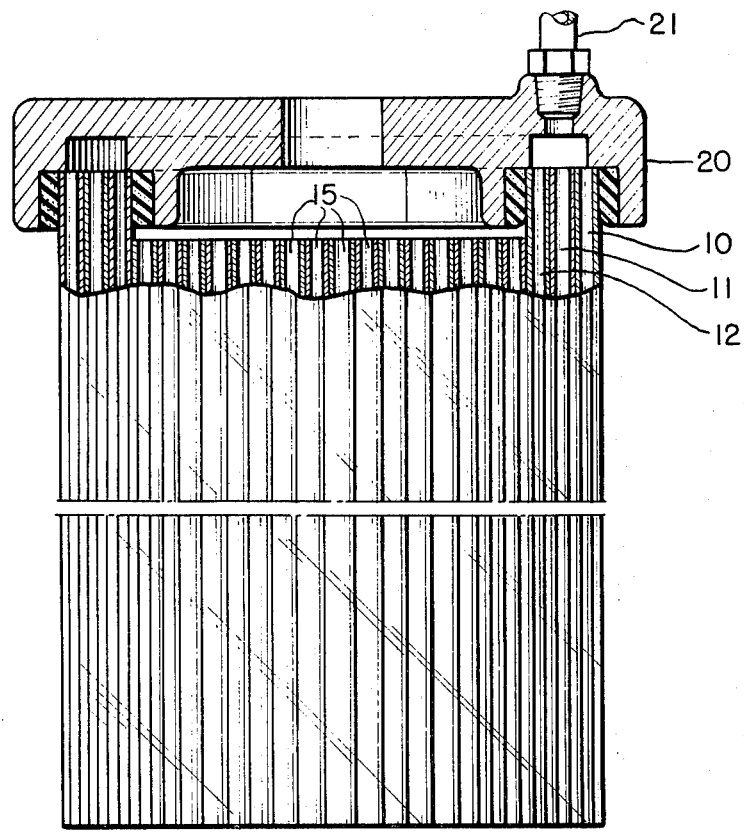

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

FIG. 1 represents a plan view of a macroboule which may be processed in accordance with the invention; and FIG. 2 represents a convenient arrangement for practicing the invention.

As stated above, appropriate mechanisms for forming the macroboules, microbundles and microboules and even channel multiplier plates are described in the aforementioned application which is incorporated herein by reference. The present invention concerns an improvement in the processing techniques which contributes to more uniformity in the diameter of channel elements and hence more uniform gain in the resulting channel multiplier plates. Accordingly, only so much of the processing as is necessary to an understanding of the present invention will be described in the material which follows.

The macroboule which may be considered the starting point for an understanding of the instant invention is shown schematically in FIG. 1. It is hexagonal in cross section and is formed of a multiplicity of similar hollow or fiber channel elements of fusible material arranged in a bundle. The elementary channels may, for example, be formed of lead oxide glass such as Corning type 8161. The individual channels are preferably hexagonal in cross section with an inside diameter of 0.1 inches and an outside diameter of 0.125 inches. They are formed into the bundle of FIG. 1 by means of a mold of similar cross sectional configuration into which the individual channel elements are stacked. The view of FIG. 2 shows the three peripheral rows 10, 11 and 12 of channel elements to be longer than the rows 15 of channel elements that are surrounded by the first mentioned peripheral rows. The reason for this difference in length will be made more clear hereafter. The bundle may be heated while confined within its mold to fuse the individual channel elements together in order to create a macroboule as a single unitary structure comprising the many hollow channels of macrotubing.

Having formed the macroboule and freed it from its forming mold, it is arranged to be fed into a vertically disposed oven and heated to a drawing temperature. It is heated to the point where the glass is softened sufficiently to be drawn by pulling and the amount of draw or reduction in cross sectional dimension is a function of the relative rates at which the macroboule is fed into the oven at one end while the softened or pulled end thereof is drawn by capstans, as explained in the Singer application. The improvement of the present invention contemplates maintaining the bundle under a condition of differential fluid pressure throughout the drawing step. This may be readily accomplished by establishing a fluid pressure within the peripheral elements of the bundle which exceeds that of the central elements of the bundle. It is found that pulling the softened bundle in reducing the original dimensions of the macroboule tends to introduce nonuniformity in the diameter of the channel elements. In particular, the diameter tends to decrease with radial distance of the channel element from the center of the bundle. The inventive concept features maintaining a differential pressure within the channel elements of the bundle during the drawing step to compensate this tendency toward nonuniformity of channel diameter to the end that the channel elements of the resulting microboule have an essentially uniform diameter.

More specifically, the desired result may ensue from having a flow of gas such as air directed into the various channels of the bundle with the pressure changing from a minimum at the center of the bundle to a maximum at the outer periphery. Ideally the fluid pressure changes continuously from center to the periphery of the bundle but this is difficult to practice in view of the number and small size of the channel elements which form the bundle. An acceptable approximation is to introduce step variations in fluid pressure and indeed the simple arrangement of FIG. 2 permits substantial improvement in uniformity of channel diameter.

As shown in FIG. 2 the three peripheral rows 10, 11 and 12 of channel elements are longer than the remaining ones or are otherwise axially displaced in order to be enclosed by an annular cap or manifold 20 to the exclusion of the other channels of the bundle. As air line 21 from a suitable source (not shown) is connected to this manifold to supply air under pressure to only the peripheral rows of channel elements. With this relatively simple structural arrangement, an increased fluid pressure is established within only those fiber elements which constitute peripheral rows of the bundle. An appropriate adjustment of the pressure materially improves the uniformity of channel diameter in the microbundle. By way of illustration an air pressure of 15 to 20 pounds above atmosphere introduced into the three outer rows of channel elements materially improves the uniformity of channel diameter and uniformity of gain across a channel plate formed from a microbundle that has been processed in this fashion.

The described process, featuring increased pressure in only the peripheral rows of channel elements, has permitted the fabrication of channel plates with a negligible fixed noise pattern over an excitation potential range between 700 and 1,000 volts with an electron multiplication gain of approximately 10,000. This gain, of course, is a consequence of electron multiplication. As described in the Singer application, the channel elements are fired in hydrogen in order to have the desired secondary emitting properties and also to be rendered conductive so that an applied potential may establish an axially directed field necessary for translating an image with gain through a plate of such electron multiplying channel elements.

Another approach to the fixed noise pattern problem of multiplier plates is the subject of an application Ser. No. 490,784, filed concurrently herewith in the name of Joseph Singer, Jr., and assigned to the assignee of this application. This other approach features weighting of the channel walls to avoid noise patterns.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. In the manufacture of a fiber bundle, the process which comprises the steps of:
    forming a multiplicity of similar hollow fiber elements of fusible material into a bundle of a desired cross sectional configuration and area;
    heating said bundle to a drawing temperature;
    drawing the heated bundle to a reduced cross sectional area but of the same cross sectional configuration;
    and maintaining in said bundle during the drawing step a differential fluid pressure by establishing a fluid pressure within the peripheral elements of said bundle which exceeds that of the central elements of said bundle to compensate the tendency of said drawing step to introduce a non uniformity in the internal diameter of said fibers with respect to one another.

2. In the manufacture of a fiber bundle, the process which comprises the steps of:
    forming a multiplicity of similar hollow fiber elements of fusible material into a bundle of a desired cross sectional configuration and area;
    heating said bundle to a drawing temperature;
    drawing the heated bundle to a reduced cross sectional area but of the same cross sectional configuration;

and maintaining in said bundle during the drawing step a differential fluid pressure by establishing a fluid pressure which varies from a maximum within the fiber elements at the periphery of said bundle to a minimum within the fiber elements at the center of said bundle to compensate the tendency of said drawing step to introduce a non uniformity in the internal diameter of said fibers with respect to one another.

3. In the manufacture of a fiber bundle, the process which comprises the steps of:

forming a multiplicity of similar hollow fiber elements of fusible material into a bundle of a desired cross sectional configuration and area;

heating said bundle to a drawing temperature;

drawing the heated bundle to a reduced cross sectional area but of the same cross sectional configuration;

and maintaining during the drawing step a fluid pressure within the fiber elements constituting the peripheral rows of said bundle which exceeds that within the remaining fiber elements of said bundle to compensate the tendency of said drawing step to introduce a non uniformity in the internal diameter of said fibers with respect to one another.

4. In the manufacture of a channel multiplier plate, the process which comprises the steps of:

forming a multiplicity of similar hollow channel elements of a glass containing a metallic oxide into a bundle of a desired cross sectional configuration and area;

heating said bundle to the softening temperature of the metallic oxide glass;

drawing the heated bundle to a reduced cross sectional area but of the same cross sectional configuration;

and maintaining in said bundle during the drawing step a differential fluid pressure by establishing a fluid pressure within the peripheral elements of said bundle which exceeds that of the central elements of said bundle to compensate the tendency of said drawing step to introduce a non uniformity in the internal diameter of said fibers with respect to one another.

5. In the manufacture of a channel multiplier plate, the process which comprises the steps of:

forming a multiplicity of similar hollow channel elements of a glass containing a metallic oxide into a bundle of a desired cross sectional configuration and area;

heating said bundle to the softening temperature of the metallic oxide glass;

drawing the heated bundle to a reduced cross sectional area but of the same cross sectional configuration;

and maintaining in said bundle during the drawing step a differential fluid pressure, greater in the peripheral rows of said bundle than in the center thereof, to maintain a substantially uniform diameter in the channel elements of the drawn bundle.

* * * * *